May 1, 1956  E. M. PECK  2,743,772
COMBINED VEHICLE WINDOW GLASS AND SCREEN
Filed March 31, 1953  2 Sheets-Sheet 1

Effie M. Peck
INVENTOR.

May 1, 1956      E. M. PECK      2,743,772
COMBINED VEHICLE WINDOW GLASS AND SCREEN
Filed March 31, 1953      2 Sheets-Sheet 2
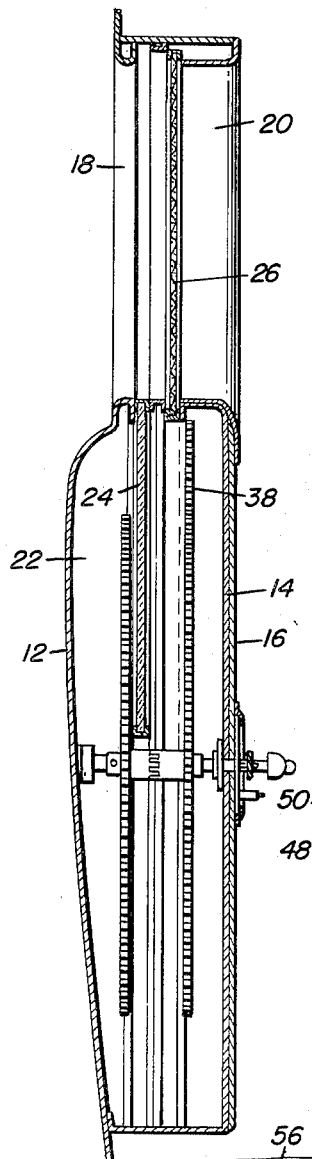
Effie M. Peck
*INVENTOR.*

/ 
United States Patent Office 2,743,772
Patented May 1, 1956

2,743,772

COMBINED VEHICLE WINDOW GLASS AND SCREEN

Effie M. Peck, Attleboro, Mass.

Application March 31, 1953, Serial No. 345,791

1 Claim. (Cl. 160—103)

This invention relates generally to door structures and pertains more particularly to automotive doors.

A primary object of this invention is to provide an automobile door with both a window panel and a screen panel, these panels being selectively operated into closing relation to the window opening of the door.

Another object of this invention is to provide a vehicle door with means for preventing foreign material and the like from entering the vehicle while a window thereof is in open position, such means at the same time permitting normal operation of the vehicle as regards hand signals and the ilke.

Another object of this invention is to provide a vehicle door with a combined window and screen assembly, such assembly being movable in opposite directions simultaneously in response to a single actuating mechanism.

Another object of this invention resides in the provision of a door assembly in conformity with the foregoing objects which includes selective disengageable position of the screen panel drive means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a vertical section taken substantially along the plane of section line 2—2 of Figure 1 showing details of the panel assembly;

Figure 3 is an enlarged section of the drive mechanism as shown in Figure 2, the drive mechanism being shown in simultaneous operating position;

Figure 4 is an enlarged section similar to Figure 3 but showing the drive assembly in position for disengaging the drive to the screen panel;

Figure 5 is a horizontal section taken substantially along the plane of section line 5—5 of Figure 4 and showing a portion of the panel assemblies on an enlarged scale.

Figure 1:
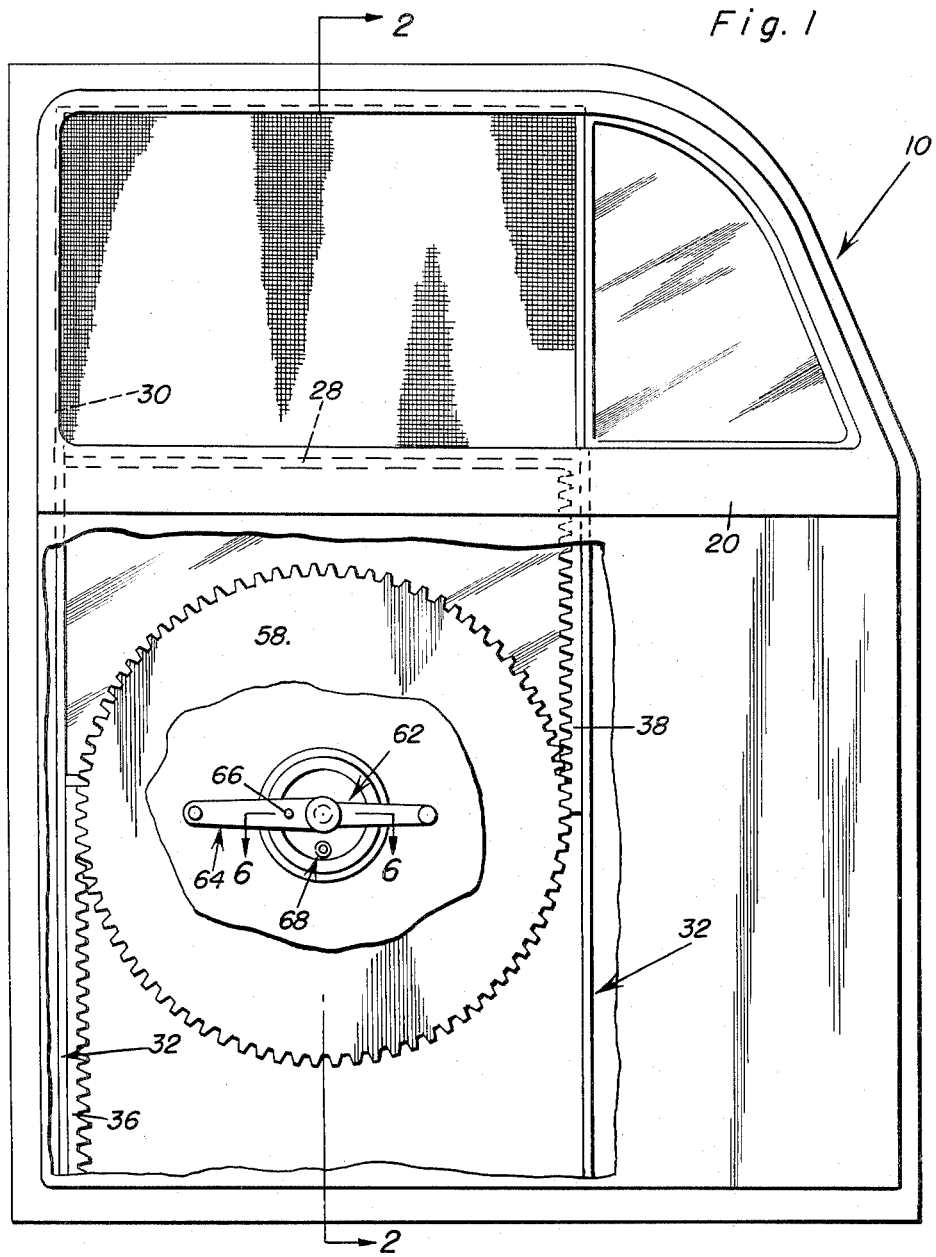
Figure 1 is a side elevation of a vehicle door with portions broken away to show details of the novel combined window glass and screen assembly.

Referring now more particularly to Figure 1, reference numeral 10 indicates generally the structure of a vehicle door, the structural framework being entirely conventional in nature and including, as shown in Figure 2, an outer wall 12, an inner wall 14, and an ornamental decorative side panel 16. Also, the door is provided with the usual window opening surrounded by the rolled edge 18 on the outside thereof and surrounded by the garnished molding 20 on the inside. Storage compartment 22 is presented by virtue of the spacing between the inner and outer wall members and the portion of the door forming a top for this compartment is provided with a pair of parallel longitudinally extending slots through which a window glass panel 24 and a screen panel 26 are projectable for the purpose of moving into closing relation with the window opening of the door.

Referring now more particularly to Figures 1 and 5, each of the panels are provided with a U-shaped reinforcing frame comprising bottom frame members 28 and side frame members 30 which frame members are also of U-shape in cross section to embrace peripheral portions of the panel to which they are secured. Suitably secured to the door are four guide channels 32 disposed in paired relation, each pair being spaced from the other and corresponding one of each pair being cooperable to receive the opposite sides of each panel assembly to guide the same during their vertical movement in the door assembly.

Each guide is substantially wider than the panel and consequently project laterally at each side thereof so that not only are the channels positioned in proper spaced relation but also lateral portions 34 of the guides provide stabilizing means as will be presently apparent.

One side frame member of each panel is provided with a depending toothed rack, these racks being designated 36 and 38 for the window glass and screen panel, respectively and are positioned at opposite sides of the door in mutually opposed relation.

A drive shaft 40 is journaled transversely of the door, its outer end being rotatably received in door bracket 42 and its opposite end being rotatably received in sliding sleeve 44, which is, in turn, journaled in bearing 46 secured to the inner wall 14. The nut and thrust washer 48 and 50, respectively, on the threaded outer end of the shaft cooperating with bearing collar 52 and the hub portion 54 of pinion 56 secured to the shaft to prevent longitudinal shifting of the latter. Another pinion 58, parallel to the first, is secured to the sliding sleeve and each pinion is provided with the toothed hub portion 60 mutually engageable for simultaneous rotation of the pinion as shown in Figure 3. Of course, when the sleeve is outwardly slid, the pinion 56 is moved out of engagement with the rack 38 and with the other pinion 56 and will remain stationary while the shaft is free to rotate therein to drive the pinion 58 and consequently the window glass rack 36. It will be noted that each of the racks engages against the previously described lateral portion 34 of the panel guide, such portion absorbing the thrust imparted to the rack.

Figure 6:
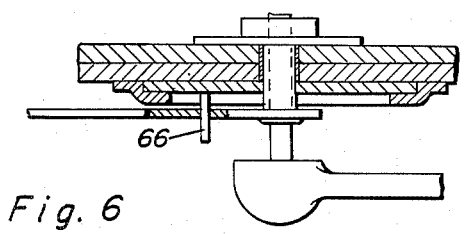
Figure 6 is a horizontal section taken substantially along the plane of section line 6—6 of Figure 1 showing a portion of the drive assembly on an enlarged scale and in the position as shown in Figure 3.

The free end of the drive shaft is provided with a hand crank 62 for manual rotation as the free end of slidable sleeve 44 is provided with crank lever 64 by which the drive to the second pinion 58 is selected. In this respect, it will be noted that the lever has an aperture to receive either the pin 66 when the drive is engaged, see Figure 6, or the reduced end portion of the spacer pin 68 which serves to maintain a drive to the second pinion disengaged, see Figure 3. These pins are secured in circumferentially spaced relation on the plate 70 mounted by annular ring 72 to the door, and in operation it is merely necessary to pull on the lever to disengage it from the pin with which it is associated and rotate the lever to the other pin to select the proper drive relation. Of course, it may be desirable to provide spring means for normally urging the pinion into engaged relation.

By controlling the lever 64, the operator may manipulate the window glass panel in the conventional manner or he may position the screen panel to any desired location with respect to the window opening by properly manipulating the lever 64 to engage the drive to the screen panel.

It will be manifest that the screen panel may be employed to positively prevent the entry of any foreign material or objects into the interior of the automobile or other vehicle, which objects might cause discomfort to the occupants of the vehicle, or under certain conditions, might present a hazard to the occupant which might occur should the driver of the vehicle be distracted from his operating duties by the entry of such foreign material or objects. Moreover, the provision of this combined glass and screen assembly will permit a maximum of comfort for persons sleeping in vehicles especially during the summer months when insects are most annoying.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In a vehicle having a door provided with a window opening and a compartment, a window panel and a screen panel, parallel to each other and movable out of and into said compartment into and from closing relation to said opening, means for moving said window panel into opening position and the screen panel into closing relation comprising a drive shaft in said compartment extending out of said door, and having a drive pinion fast thereon for moving said window panel, a rotary sleeve on said shaft extending out of said door, a drive pinion on said sleeve and in said compartment for moving said screen panel, said sleeve being slidable in opposite directions on said shaft into two positions, clutch members on said pinions engaged and disengaged by sliding of said sleeve into said two positions and drivingly connecting the first named pinion to the second named pinion when said members are engaged, an operating hand crank on said shaft outwardly of said door, a lever fixed on said shaft outwardly of said door for sliding the sleeve, and means for locking the lever to the door in either position of said sleeve.

References Cited in the file of this patent
UNITED STATES PATENTS

| | | |
|---|---|---|
| 551,643 | Leary | Dec. 17, 1895 |
| 606,262 | Young | June 28, 1898 |
| 820,415 | Hardy et al. | May 15, 1906 |
| 1,007,499 | Sprinehorn | Oct. 31, 1911 |
| 1,358,464 | Reiben | Nov. 9, 1920 |
| 1,683,914 | Pfiffer | Sept. 11, 1928 |
| 1,722,481 | Ragsdale | July 30, 1929 |
| 1,808,129 | Bullis | June 2, 1931 |
| 2,011,301 | Robinson | Aug. 13, 1935 |
| 2,625,218 | Nihon | Jan. 13, 1953 |
| 2,650,858 | Lange | Sept. 1, 1953 |